(12) United States Patent
Epstein et al.

(10) Patent No.: US 9,041,239 B2
(45) Date of Patent: May 26, 2015

(54) VERTICAL AXIS WIND TURBINE WITH CAMBERED AIRFOIL BLADES

(71) Applicants: Martin Epstein, Seminole, FL (US); Jon Eric Harms, Seminole, FL (US); William Stinson, Melbourne, FL (US); Claudio Esposito, Indialantic, FL (US)

(72) Inventors: Martin Epstein, Seminole, FL (US); Jon Eric Harms, Seminole, FL (US); William Stinson, Melbourne, FL (US); Claudio Esposito, Indialantic, FL (US)

(*) Notice: Subject to any disclaimer, the term of this patent is extended or adjusted under 35 U.S.C. 154(b) by 0 days.

(21) Appl. No.: 14/026,668

(22) Filed: Sep. 13, 2013

(65) Prior Publication Data

US 2014/0077504 A1   Mar. 20, 2014

Related U.S. Application Data

(60) Provisional application No. 61/700,562, filed on Sep. 13, 2012.

(51) Int. Cl.

| F03D 7/00 | (2006.01) |
|---|---|
| F03D 3/00 | (2006.01) |
| F03D 9/00 | (2006.01) |
| F03D 3/06 | (2006.01) |

(52) U.S. Cl.
CPC ............... *F03D 3/005* (2013.01); *F03D 9/002* (2013.01); *F03D 3/065* (2013.01); *F05B 2240/95* (2013.01); *Y02E 10/74* (2013.01)

(58) Field of Classification Search
CPC .......... F03D 3/005; F03D 3/065; Y02E 10/74
USPC ..................................................... 290/44, 55
See application file for complete search history.

(56) References Cited

U.S. PATENT DOCUMENTS

| 1,835,018 | A | 12/1931 | Darrieus | |
|---|---|---|---|---|
| 5,969,660 | A | 10/1999 | Veazey | |
| 6,666,650 | B1* | 12/2003 | Themel | 416/200 R |
| 6,921,986 | B2* | 7/2005 | Bayer | 290/55 |
| 2007/0059097 | A1* | 3/2007 | Chen | 404/71 |
| 2008/0014086 | A1 | 1/2008 | Lin | |
| 2009/0191057 | A1 | 7/2009 | Knutson | |
| 2010/0148516 | A1 | 6/2010 | Buhtz | |
| 2010/0295319 | A1* | 11/2010 | Britnell | 290/55 |

(Continued)

FOREIGN PATENT DOCUMENTS

| JP | 2006316751 | 11/2006 |
|---|---|---|
| WO | 2008088921 A2 | 7/2008 |

OTHER PUBLICATIONS

Translation of Japanese Publication No. 2006316751 (filing date May 16, 2005) with a publication date of Nov. 24, 2006; Applicant: Hashizume Takumi et al.

(Continued)

*Primary Examiner* — Tho D Ta
(74) *Attorney, Agent, or Firm* — Nicholas Pfeifer; Andriy Lytvyn; Smith & Hopen, P.A.

(57) ABSTRACT

A wind turbine having blades that rotate in a horizontal plane about a vertical axis. A single output shaft is directly connected by one-way bearings to the driven shaft of a permanent magnet generator. This eliminates the need for a gearbox and also eliminates the need for inverters. Friction losses are further reduced by suspending the vertical shaft with magnetic bearings. Airfoils are positioned in a specific vertical design so that they cup the wind on a lower concave portion of the airfoil for self-starting capability. Stealth radar-absorbing mesh and faceted mounting structures reduce scrambling of radar returns.

18 Claims, 10 Drawing Sheets

(56) References Cited

U.S. PATENT DOCUMENTS

| | | | |
|---|---|---|---|
| 2011/0031756 A1* | 2/2011 | Gabrys | 290/55 |
| 2011/0280708 A1* | 11/2011 | Cochrane | 415/4.4 |
| 2012/0141291 A1* | 6/2012 | Appleton | 416/241 R |
| 2013/0115069 A1* | 5/2013 | Zha et al. | 415/191 |

OTHER PUBLICATIONS

International Search Report and Written Opinion for PCT/US2013/059718 (filing date: Sep. 13, 2013) with a mailing date of Dec. 11, 2013; Applicant: Epstein, Martin et al.

* cited by examiner

VERTICAL AXIS WIND TURBINE WITH CAMBERED AIRFOIL BLADES

CROSS REFERENCE TO RELATED APPLICATION

This application claims priority to U.S. Prov. Pat. Appl. No. 61/700,562, entitled "VERTICAL WIND TURBINE FOR CONTINUOUS POWER PRODUCTION," filed on Sep. 13, 2012, the contents of which are hereby incorporated by reference.

BACKGROUND OF THE INVENTION

1. Field of the Invention

This invention relates, generally, to wind turbines. More particularly, it relates to a high-efficiency vertical wind turbine.

2. Description of the Prior Art

As the cost of fossil fuels rises and their harmful effects on the environment come to forefront of global attention, alternative sources of energy grow in importance. One source of clean sustainable energy is wind. Humans have been harvesting the power of the wind for numerous applications for millennia. In the recent decades, wind turbines have become a significant source of electricity for many areas, and they are quickly becoming more widespread.

All wind turbines may be subdivided into two classes: horizontal axis wind turbines (HAWT) and vertical axis wind turbines (VAWT). Although a number of VAWT are known in the art, prevalent majority of the currently operating wind turbines are HAWT.

Conventional HAWTs have a number of serious flaws. The blades of a conventional HAWT must always be facing the wind, which requires a control mechanism to continuously adjust the blades to achieve ideal efficiency. This increases the complexity of the design, which results in higher manufacturing and maintenance costs and a higher risk of failure. The blades of a HAWT rotate slowly in a vertical plane about a horizontal axis, and a speed-increasing gearbox is therefore required to connect the slowly rotating blades to a power generator. The presence of a gearbox introduces additional frictional forces into the structure that reduce the power produced by the generator and also requires inverters between the generator and the power grid.

Conventional blades also have little self-start capacity. As a result, energy has to be applied to the blades to re-start their rotation after an interval of no or low wind conditions. Moreover, the large cantilevered design puts strong force moments on bearings with resultant energy loss and noise. Large forces are created by such conventional designs, and large forces lead to high maintenance and high overhead costs. The large surface area of conventional blades creates problems in high wind conditions, creating even more maintenance issues. Furthermore, the complexity of HAWT designs requires a large number of moving parts, therefore increasing the risk of mechanical failure. High fabrication cost, high assembly cost, and high maintenance cost increase the price of the energy produced, making wind energy a less lucrative option.

Other shortcomings of HAWTs are associated with long rotating blades interfering with radars. Long continuously rotating blades constantly ping radars and cause problems with radar coverage, which may be especially problematic for turbines positioned in open waters where vessels and aircraft heavily rely on radars.

Although a number of VAWT designs are known in the art, they are also flawed. The two main types of VAWTs are Darrieus and Savonius. Darrieus VAWT design was first disclosed in U.S. Pat. No. 1,835,018. Darrieus design generates electricity by utilizing symmetrical airfoils which move in a circular path when the wind is present. A major advantage of Darrieus turbine is that unlike conventional HAWT designs, Darrieus design can operate in the airflow of any directions without necessitating adjustment due to changes in the wind direction. However, Darrieus turbine is not self-starting, which means that when the turbine is stationary, there is not net rotational force even when the wind speed rises. Accordingly, a starting device is necessary to bring Darrius turbine into operation each time the wind stops and picks up again.

Another type of VAWTS are Savonius turbines. This design is fairly simple and comprises a number of vertically-mounted airfoils on a rotating shaft. VAWTs built according to Savonius design are self-starting and require considerably less maintenance than other designs. These advantages, however, come at a steep price of greatly reduced efficiency.

Accordingly, there is a need for economical wind turbines that rotate in a horizontal plane about a vertical axis, have good self-starting capacity, require no gearbox, and which incorporate advances in magnetic bearing strength and shape to minimize frictional loss. There is also a need for an improved wind turbine design that reduces pinging or scrambling of sensitive radar signals.

However, in view of the art considered as a whole at the time the present invention was made, it was not obvious to those of ordinary skill in the art how the needed improvements could be provided.

SUMMARY OF THE INVENTION

The long-standing but heretofore unfulfilled need for improvements in wind turbines is now met by a new, useful, and non-obvious invention.

The novel wind turbine has blades that rotate in a horizontal plane about a vertical axis. A single output shaft is directly connected by one-way bearings to the driven shaft of a permanent magnet generator so that no gearbox is required and the elimination of the gearbox greatly reduces the friction losses of the system. Friction losses are further reduced by suspending the vertical axis of all rotating components with custom-designed magnetic bearings. Airfoils are positioned in a specific vertical design so that they cup the wind on a lower concave portion of the airfoil for self-starting capability. Stealth radar-absorbing mesh and faceted mounting structures reduce scrambling of radar returns.

Less moving parts limit the need for substantial on-going maintenance. Gearboxes, required in the conventional offshore wind designs are eliminated. The rotational speed of the vertical wind turbine is wind speed variable with associated variable electrical output. This variable output is matched with the charging requirements of the permanent magnet generator via highly-efficient rectification onboard the generator platform. Current regulation/rectification from the wind turbine is not necessary and saves cost. Also, there is no need for any pitch adjustment in this vertical wind turbine as it can automatically capture wind from any direction and at any angle.

A vertical axis wind turbine according to the present invention has a top plate and a bottom plate in coaxial alignment along a center axis. A plurality of blades is disposed between the top and the bottom plates in a symmetrical configuration about the center axis of the plates. Each blade is made up of at least one cambered airfoil. The airfoils being positioned in a configuration where a camber line at a leading edge of each airfoil is perpendicular to a normal to the center axis. A shaft is attached to the bottom plate, the shaft being in coaxial alignment with the center axis. The shaft being connected to a generator via a one-way bearing. No gearbox is being used to translate the rotational motion of the shaft to the rotor of the generator. Accordingly, the shaft and the rotor have the same angular velocity.

The number of blades may vary depending on an application in which the turbine is being used. However, between three and six blades provide the best functionality for most applications.

Each blade is made up of a leading airfoil and a trailing airfoil. The leading and the trailing airfoils are in a configuration where a line normal to the center axis and tangential to a trailing edge of the leading airfoil intersects the trailing airfoil at about one quarter of a chord length thereof.

A magnetic bearing may be used to support the shaft. The magnetic bearing allows the shaft to rotate about the center axis thereof while stabilizing the shaft in a vertical orientation. The magnetic bearing may be a passive or an active magnetic bearing. For active magnetic bearings, a control module and a battery are in electrical communication with the active magnetic bearing, where the control module is configured to stabilize the vertical shaft by adjusting the magnetic field within the bearing.

In an embodiment, the vertical axis wind turbine may further include a radar-absorbing mesh laterally enclosing the blades. The mesh is configured to reduce radar reflective scrambling interference by eliminating random wave return from the blades.

An object of the invention is to provide a vertical axis wind turbine that drives a single shaft directly connected to a generator so that no gearbox and the concomitant friction thereof is required between the turbine and the generator.

Another important object is to further reduce the friction of a wind turbine by suspending the vertical axis of all rotating components with custom-designed magnetic bearings.

Still another important object is to provide airfoils positioned in a specific vertical design so that they cup the wind on a lower concave portion of the airfoil for self-starting capability.

Further objects are to reduce interference with radar signals.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

Figure 1:
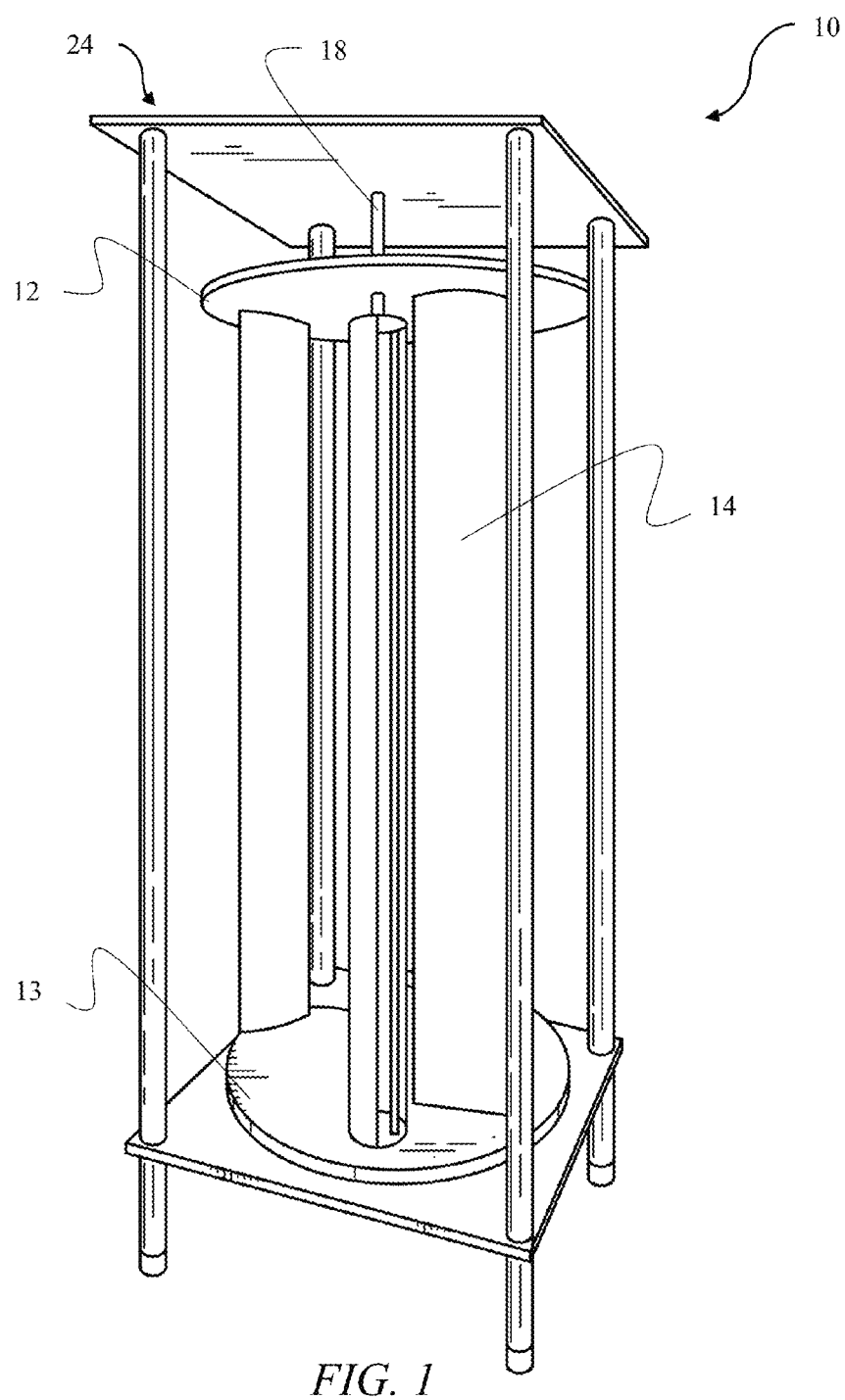
FIG. 1 is perspective view of the upper portion of the vertical axis wind turbine.

FIG. 1 depicts an illustrative embodiment of the novel structure which is denoted as a whole by the reference numeral 10.

The novel vertical axis wind turbine (VAWT) 10 is depicted in FIG. 1. VAWT 10 includes a top plate 12 and a bottom plate 13. A plurality of blades 14 is disposed between top and bottom plates 12 and 14. Blades 14 are symmetrically positioned about a center axis 17 of bottom plates 12 and 13. A vertical shaft 18 is in axial alignment with center axis 17 and is attached to bottom plate 13. In an embodiment, vertical shaft 18 may extend up to or beyond top plate 12 providing additional structural support without notable effect on aerodynamic profile of VAWT 10.

Figure 2:
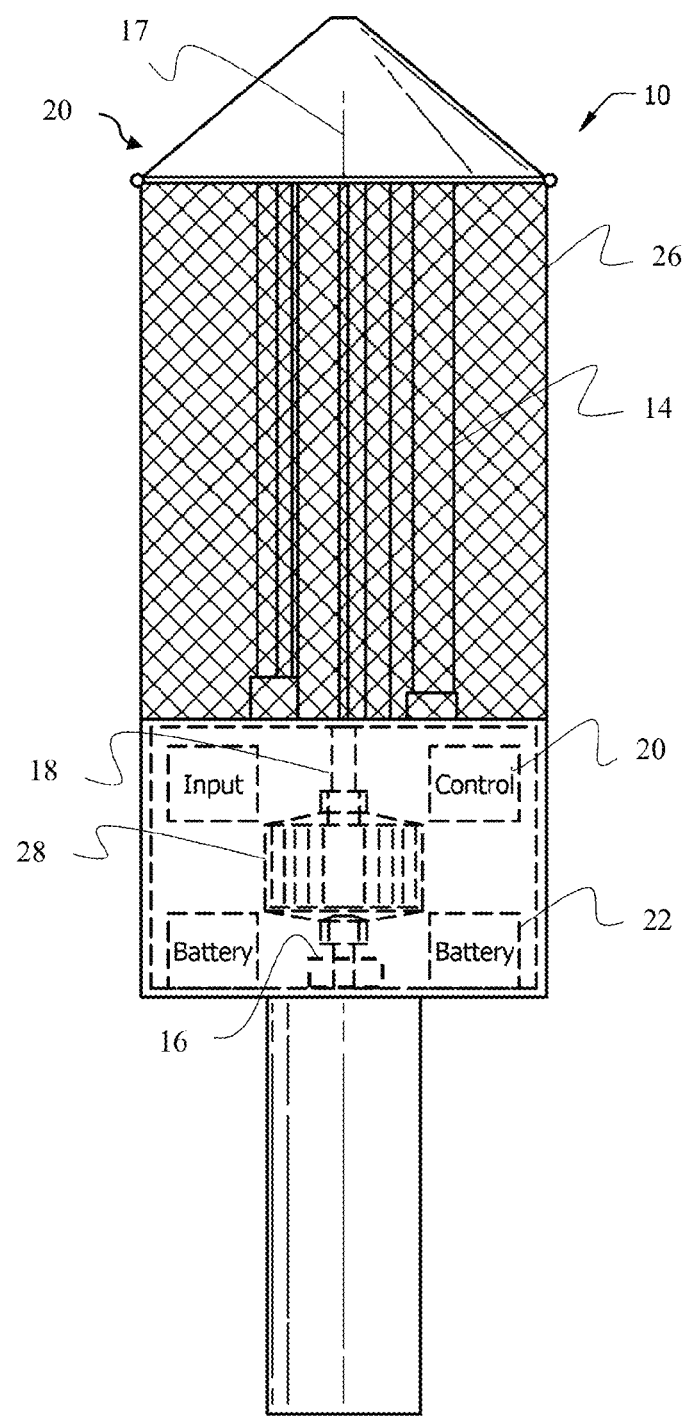
FIG. 2 is a front view of the vertical axis wind turbine.

Referring to FIG. 2, vertical shaft 18 is supported by a magnetic bearing 16. Magnetic bearing 16 significantly reduces frictional losses, and therefore, improves overall efficiency of VAWT 10. Magnetic bearing 16 may be a passive magnetic bearing utilizing permanent magnets or an active magnetic bearing utilizing electromagnets. In the embodiment where magnetic bearing 16 is an active magnetic bearing, a control module 20 and a battery 22 may be used to provide necessary continuous power input and an active control system to stabilize vertical shaft 18. This is an important feature that allows VAWT 10 to remain stable even in very high winds with alternating direction. Battery 22 is charged when VAWT 10 is operating.

VAWT 10 may be placed within housing 24. An additional magnetic bearing 16 may be positioned between top plate 12 and housing 24 to improve stability of VAWT 10. Housing 24 may be enclosed by mesh 26. Mesh 26 is configured to reduce radar reflective scrambling interference by eliminating random wave return from blades 14. Radar signature of VAWT 10 may appear as a single upright stable return similar to stationary harbor buoys or docking facilities, allowing it to be listed as a known entity navigable obstruction. This insures that coastal defense and commercial radars remain reliable without costly upgrades or unique software corrections.

Figure 3:
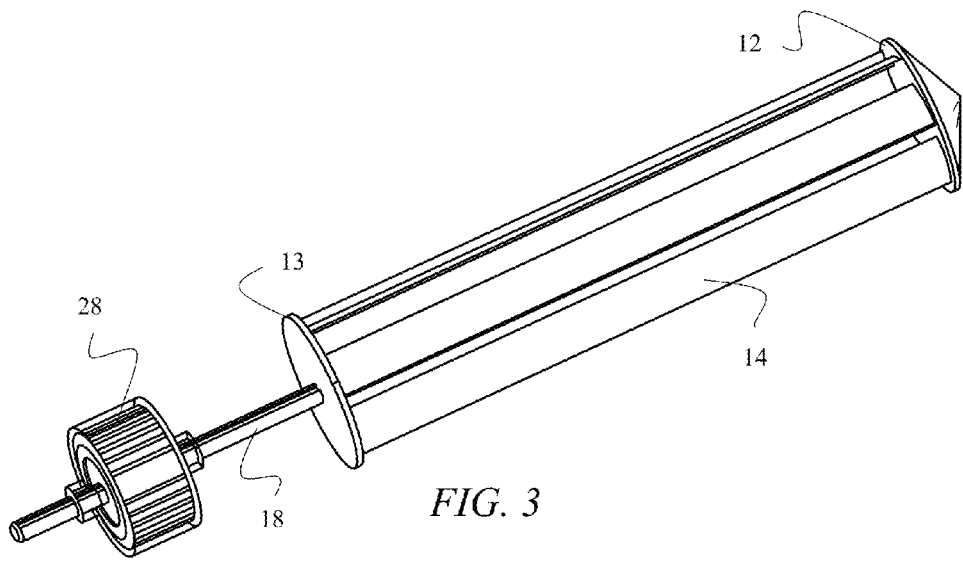
FIG. 3 is a perspective view of the shaft being connected to the generator and the blade array.
Figure 4:
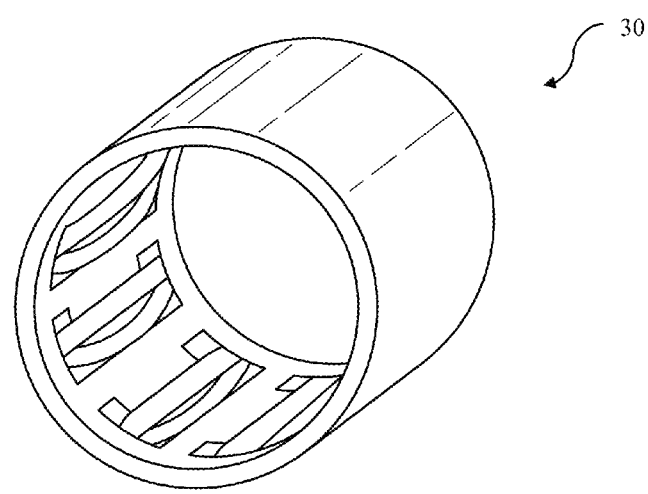
FIG. 4 is a perspective view of a one-way bearing connecting the shaft to the generator.
Figure 5:
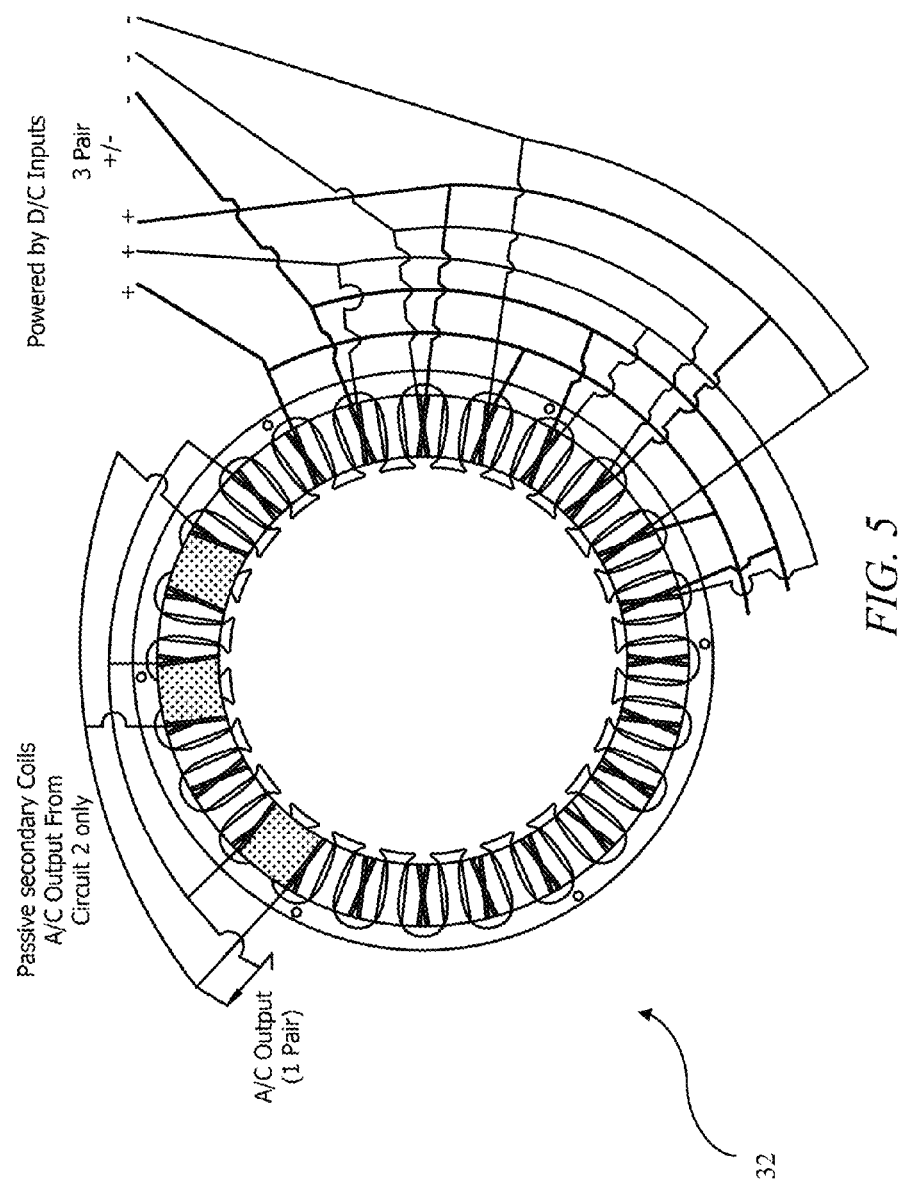
FIG. 5 is a top view of an exemplary stator of the generator.

FIG. 3 illustrates that vertical shaft 18 is directly connected to a generator 28. Vertical shaft 18 is a single output shaft, which allows it to be directly connected by one-way bearings 30 (shown in FIG. 4) to the rotor of generator 28. FIG. 5 depicts an embodiment of a stator 32 of permanent magnet generator 28.

Suspension of vertical shaft 18 by magnetic bearings 16 minimizes friction losses and allows for very high angular velocities. The high speed rotation of vertical shaft 18 matches well with permanent magnet generator 22, thereby eliminating the need for a gearbox and also eliminating the need for inverters. This design increases efficiency of VAWT 10 while reducing the number of moving parts and overall complexity, thus resulting in high reliability and low maintenance. Moreover, the one-way bearing technology and regulation/rectification of the generator output eliminates the prior art need for gearbox torque transfer. This simplifies construction, lowers cost, and improves reliability.

Figure 6A:
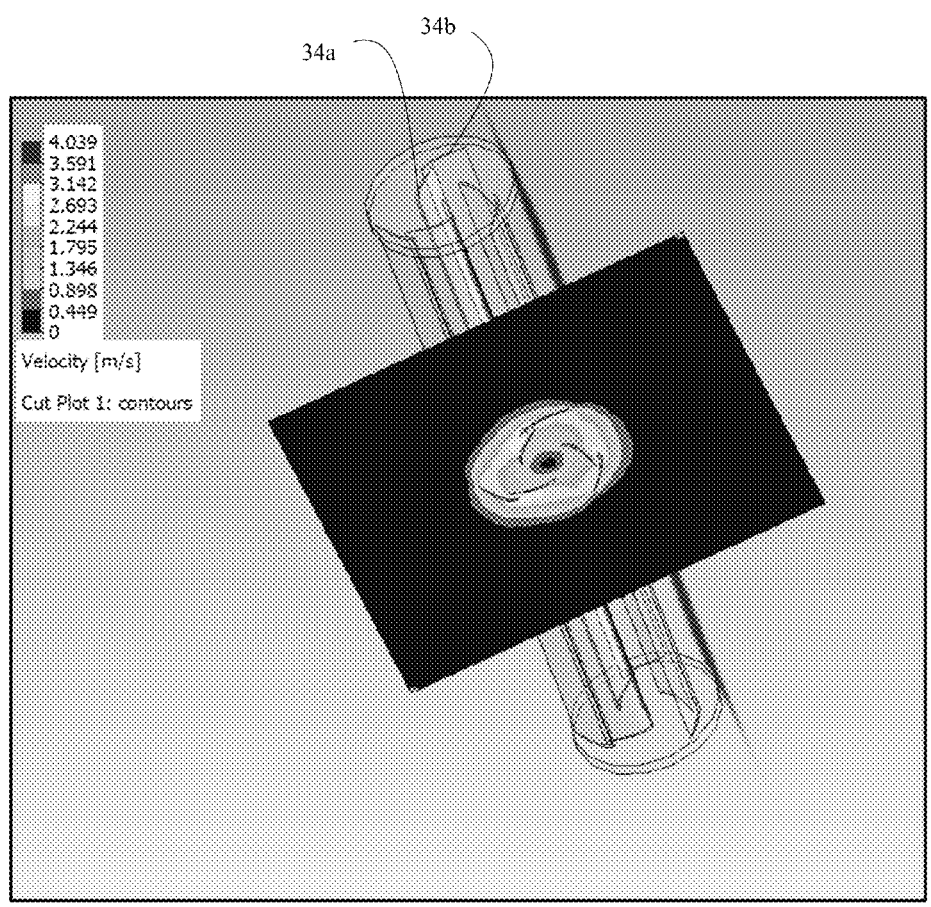
FIG. 6A is a computational fluid dynamic model depicting the velocity profile of an airflow at a cross-section of the three-blade array.
Figure 6B:
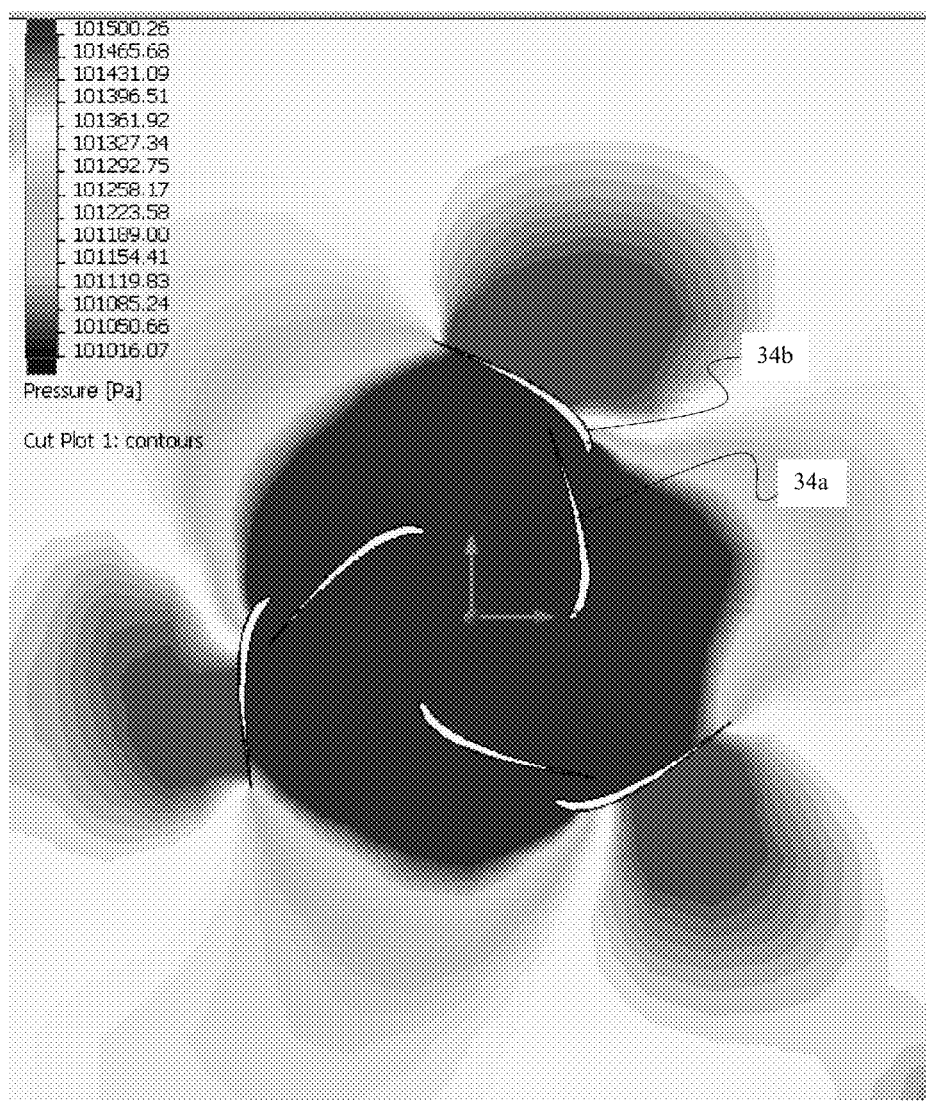
FIG. 6B is a computational fluid dynamic model depicting a pressure profile at a cross-section of the three-blade array.

One of the key aspects of VAWT 10 is the configuration of blades 14. As shown in FIGS. 6A-B, each blade 14 is made up of cambered airfoils 34a and 34b which produce lift while in high speed rotation. The lift produces a positive torque on vertical shaft 18, thus increasing its angular velocity. The concave side of each cambered airfoil 34 allows VAWT to self-start even in low wind conditions.

Airfoils 34a and 34b are positioned in a specific vertical design so that they cup the wind on a lower concave portion of the airfoil for self-starting capability. As vertical shaft 18 of VAWT 10 increases its angular velocity, the airfoil placement creates aerodynamic forces that supplement the rotational torque. Specifically, blades 14 produce aerodynamic force to assist adding torque to wind force. Blades 14 are placed in a vertical design to enhance the rotational torque.

The camber of airfoils 34a and 34b allows for high aerodynamic forces to augment the rotational torque as the speed of rotation increases. This cambered curvature follows the rotational path in a synergistic way which is shown by analysis to improve performance with increased rotational speed.

In the embodiment depicted in FIGS. 6A-B, VAWT 10 has a 3-blade configuration where each blade 14 is made up of two cambered airfoils 34. A low pressure gradient is created by air flow over each cambered airfoil 34. The air velocity is increased behind leading airfoil 34a. This accelerates the air flow over the leading edge of trailing airfoil 34b due to the lower pressure created by leading airfoil 34a. Air then attempts to fill in the low pressure area in an accelerated manner, thus increasing air velocity over trailing airfoil 34b. This increases the lift and accordingly the torque. As each blade 14 experiences this effect, the increased air flow continues to propagate. Overall, the three bladed turbines provide greater rotational force from less wind. Efficiency of VAWT 10 is in the 30% range, which is much higher than typical 11% of conventional turbines.

This design has the flexibility to use any of the NACA airfoils as airfoils 34a and 34b depending on the size and characteristics of the application. Airfoils that provide more efficient wind capture while also providing very high lift characteristics are preferred because they allow for the best conversion of wind power to usable energy. Size and cost are critical factors in creating viable VAWT 10 units for the marketplace, and therefore, various NACA airfoil designs may be used depending on the criteria of a specific application.

Orientation of leading airfoil 34a is optimal with the leading edge perpendicular to the radius because this allows the camber of leading airfoil 34a to act as the scoop for the Savonius functionality, and the lift circulation flow will bend to trailing airfoil 34b. Preferably, trailing airfoil 34b is also oriented with its leading edge perpendicular to the radius. Trailing airfoil 34b is positioned in such configuration that its leading edge extends concentrically/radially out from the trailing edge of leading airfoil 34a by approximately one quarter of the chord length. In this configuration, 3 to 6 mph air flow will start and rotate VAWT 10.

Air flow having velocity of 14 meters per second provides full 750 rpm rotation and maximum torque. When the speed of air flow causes vertical shaft 18 to rotate too fast, control module 20 may be configured to change the load of generator 22 to maintain the angular velocity within the desired range. Magnetic torque can be applied programmatically to eliminate turbine damage while simultaneously increasing output.

If the torque on vertical shaft 18 exceeds the structural capability of the design in very high wind conditions, one-way bearing 30 will disengage the generator in order to allow vertical shaft 18 to rotate in a free spin state to avoid damaging components of VAWT 10. The "free spin disconnect" torque will be very high with this design since there is no gearbox requirement which is the limiting torque factor in other turbine designs. In fact, with composite airfoil design and strong shaft materials it may not be possible to reach the "free spin disconnect" torque even in the most extreme environmental conditions.

Figure 7:
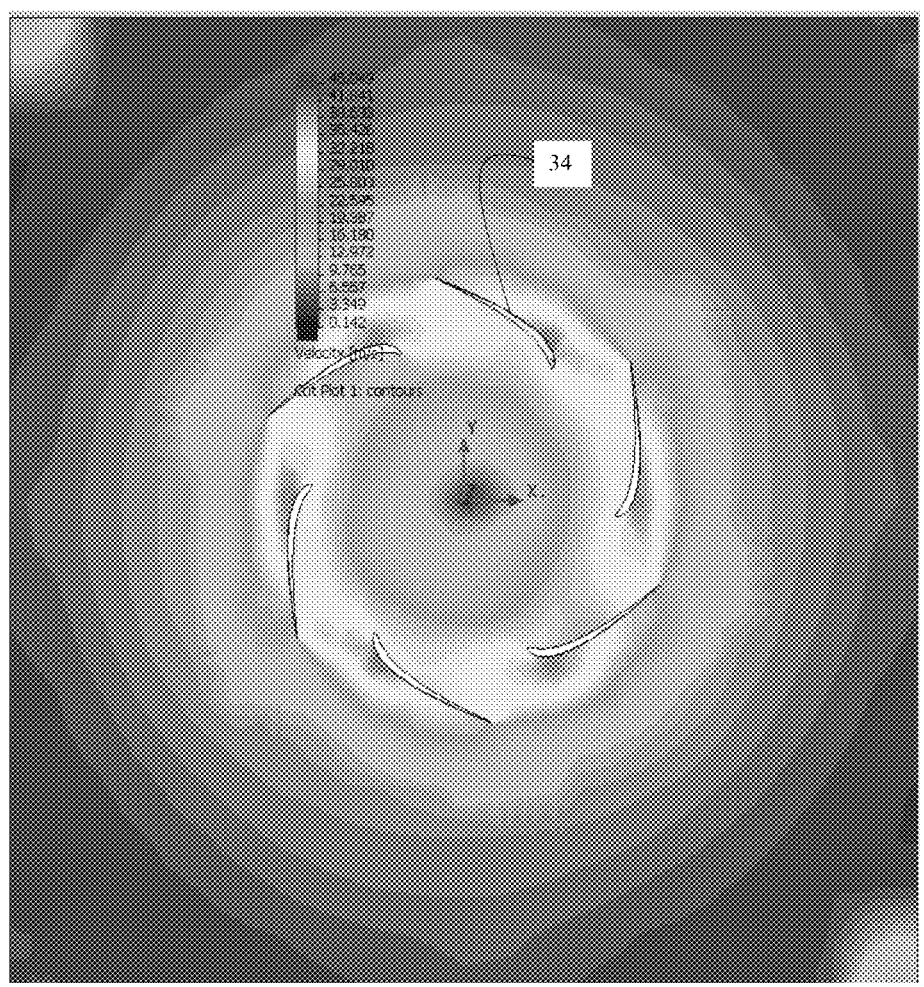
FIG. 7 is a computational fluid dynamic model depicting a pressure profile at a cross-section of the six-blade array.

FIG. 6B shows inherent pressure differences created during the aerodynamic lift process. The pressures created during operation of VAWT 10 vary greatly from the leading edge to the trailing edge of blades 14. The trailing edges of blades 14 drive the VAWT 10 into high speed rotation while at the same time create a rotating high pressure barrier which encircles the design. The leading edges have the low pressure suction which pulls VAWT 10 into high speed rotation while the trailing high pressure barrier provides a protective bubble around the design. This "protective pressure barrier" has several beneficial aspects including noise reduction and diversion of birds away from rotating blades 14 during operation. This increased area of high pressure also diverts very high winds allowing continuous operation even during serious storms, which could be problematic for conventional horizontal wind turbines An alternative configuration of blades 14 is depicted in FIG. 7. This configuration involves six blades 14 each made up of a single airfoil 34. Similar to the embodiment of FIGS. 6A-B, all blades 14 are positioned so that the leading edge of each airfoil 34 is perpendicular to the radius of top plate 12. Table 1 provides torque and power output for the three-blade and six-blade designs at various wind speeds obtained through computational fluid dynamic modeling.

TABLE 1

| V (m/s) | RPM | 3-Blade Configuration (FIG. 6) | | 6-Blade Configuration (FIG. 7) | |
|---|---|---|---|---|---|
| | | Torque (N·m) | Power (W) | Torque (N·m) | Power (W) |
| 5 | 150 | 2,588 | 25,876 | 2,755 | 26,378 |
| 7.5 | 270 | 3,582 | 53,726 | 4,036 | 55,377 |
| 9 | 450 | 5,441 | 97,931 | 7,012 | 111,699 |
| 15 | 750 | 11,968 | 359,025 | 18,911 | 502,057 |

An exemplary prototype of the invention has the following characteristics. Top and bottom plates 12 and 14 have 6 inch radii. Six identical airfoils 34 have a length of 24 inches and a chord length of about 2.5 inches. The leading edge of each airfoil 34 is positioned 2 inches away from center axis 17, where the chamber line at the leading edge of airfoils 34 is perpendicular to the radius of the top and bottom plates 12 and 14. All six airfoils 34 are equidistantly spaced from each other, making them symmetrical about center axis 17.

Figure 8:
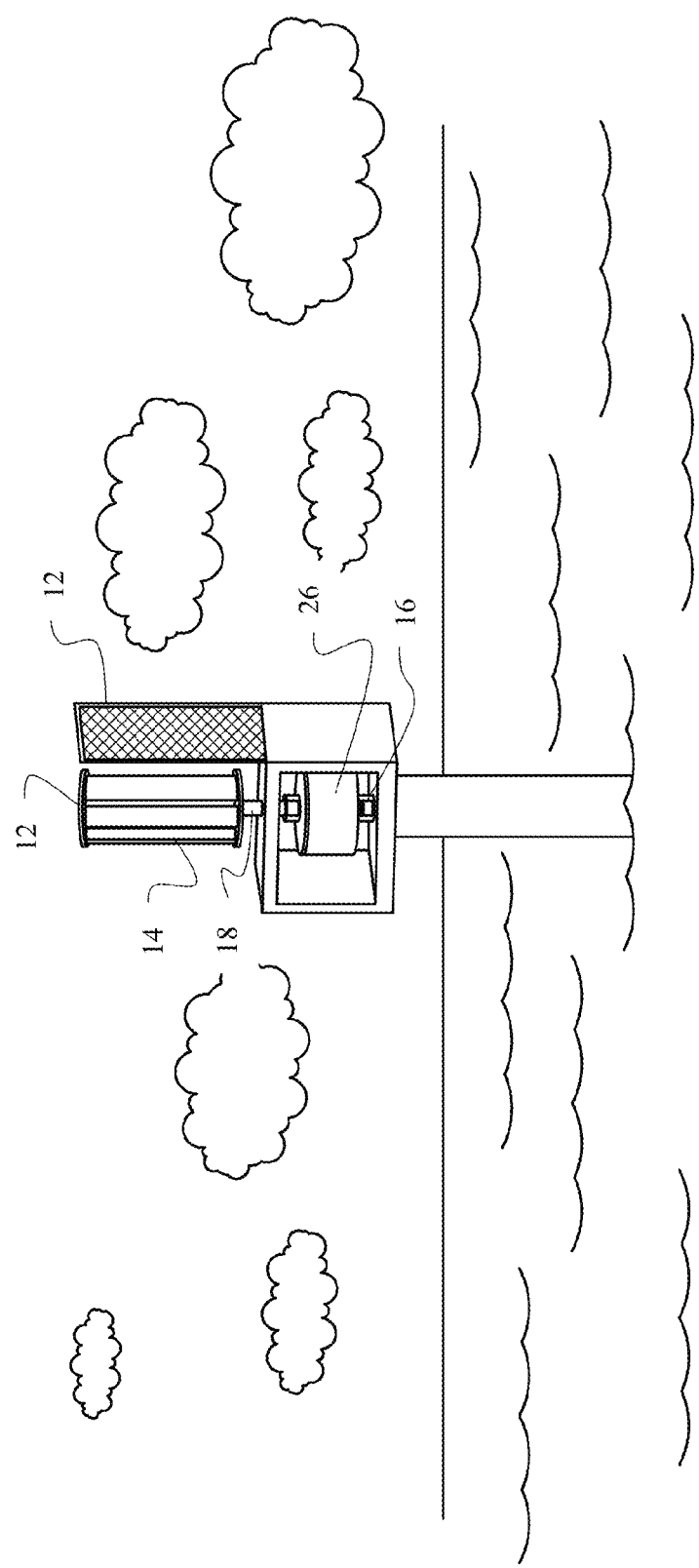
FIG. 8 depicts an off-shore implementation of the vertical axis wind turbine.
Figure 9:
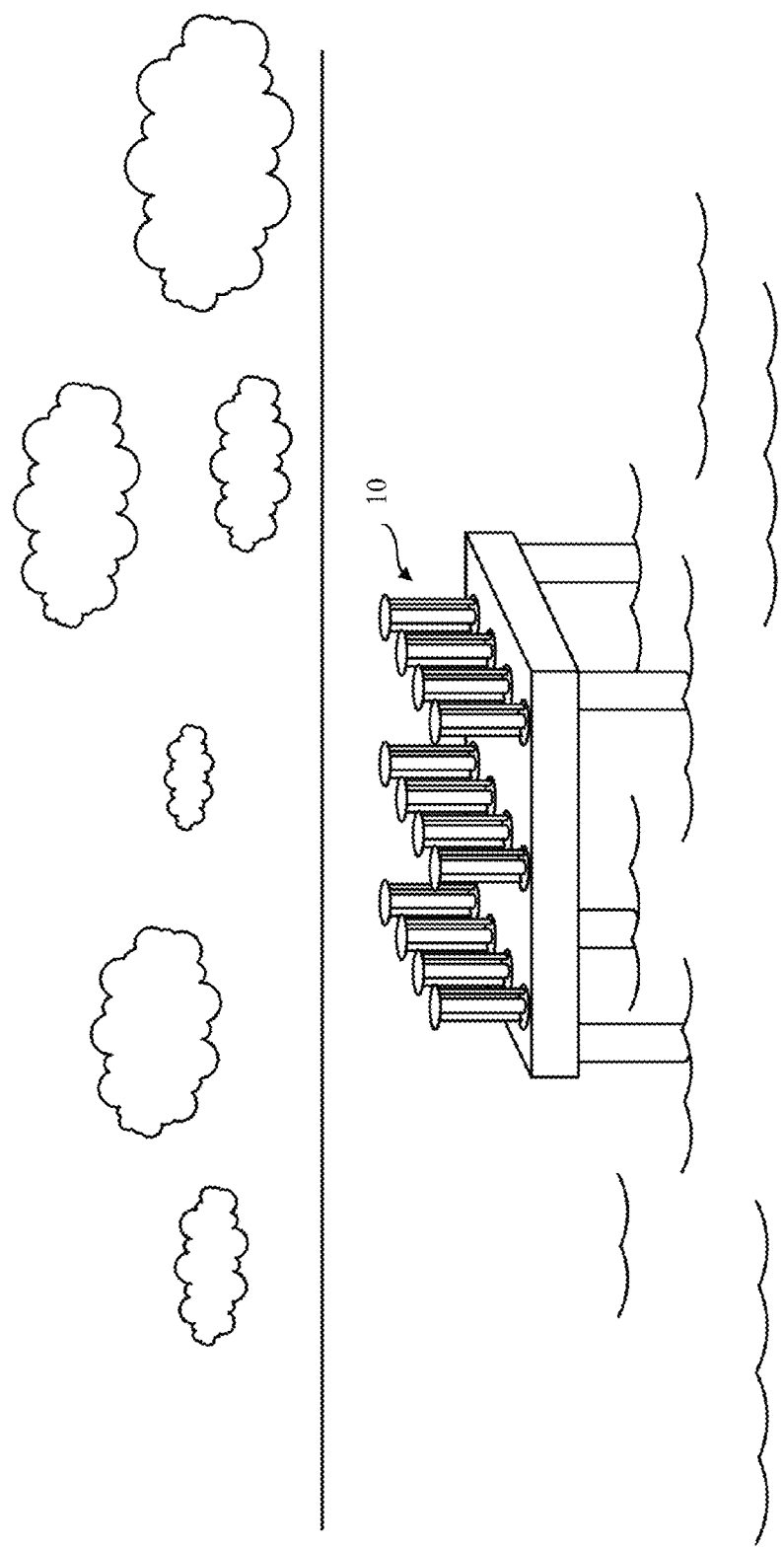
FIG. 9 depicts a an optional platform configuration of twelve turbines located on a single platform.
Figure 10:
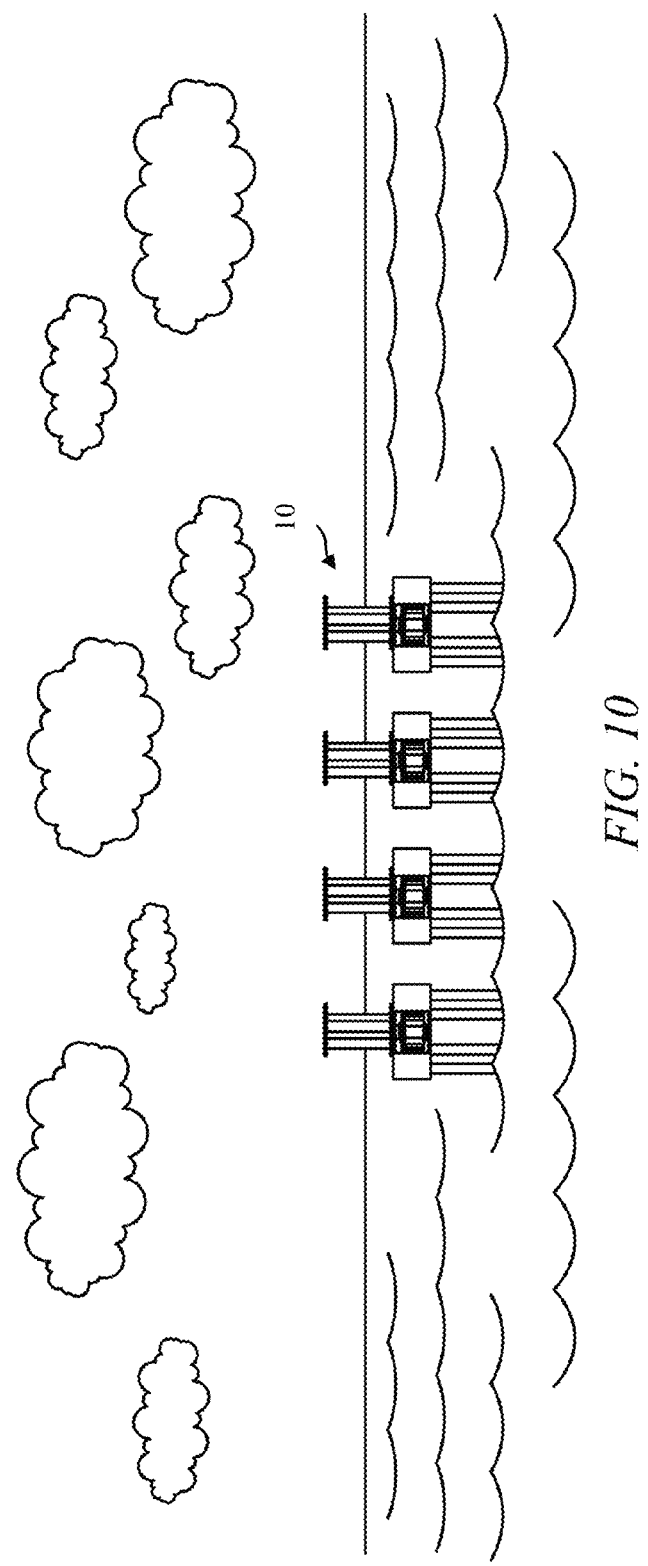
FIG. 10 depicts another optional platform configuration of four 4-pole platforms collocated in proximity.

FIG. 8 depicts an off-shore turbine implementation. The airfoil configuration of VAWT 10 allows wind capture from any direction and at any angle without the need to adjust the pitch or positioning of VAWT 10. FIGS. 9 and 10 show two optional platform configurations: twelve VAWTs 10 located on a single platform and 4 4-pole platforms collocated in proximity. In addition, VAWT 10 may be arranged in special arrays which include counter-rotating adjacent turbine towers. This allows the natural wind speed to be augmented by funneling the air flow between the towers in the wind plant. Each turbine can be aligned counter-rotating to its immediate neighbor in a "farm" topology.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

GLOSSARY OF THE CLAIM TERMS

Active magnetic bearing—a magnetic bearing that uses electromagnets to provide adequate magnetic levitation Blade—a continuous or discontinuous component of the turbine that comprises one or more vertically positioned airfoils configured to move forward in a circular path when exposed to an airflow Bottom plate—a substantially flat rigid sheet to which bottom surfaces of the blades are fixedly attached, in some embodiments bottom plate may be circular Center axis—an imaginary line that is perpendicular to both the top and the bottom plates;

in an embodiment where the plates are circular, the center axis may pass through the center of the plates Control module—a computer processing unit operating under a set of preprogramed instructions Fluidly sealed housing—a water-impermeable enclosure Leading airfoil—a part of a blade positioned in a closer proximity to the center axis than the trailing airfoil Magnetic bearing—a bearing that supports a load using magnetic levitation and is, therefore, able to levitate a rotating shaft and permit rotational motion thereof with very low friction.

One-way bearing—a bearing that allows rotation only in one direction and fully restricts rotation in the opposite direction Passive magnetic bearing—a magnetic bearing that uses permanent magnets to provide adequate magnetic levitation Permanent magnet generator—a generator where the excitation field is provided by a permanent magnet instead of a coil Radar-absorbing mesh—a material that absorbs radar waves to reduce an object's radar cross-section Shaft—an elongated substantially straight rigid component that rotates in response to movement of the blades in an airflow Top plate—a substantially flat rigid sheet to which top surfaces of the blades are fixedly attached, in some embodiments top plate may be circular Trailing airfoil—a part of a blade positioned further from the center axis than the leading airfoil

What is claimed is:

1. A vertical axis wind turbine, comprising:
a top plate and a bottom plate in coaxial alignment along a center axis, the center axis being perpendicular to both the top and the bottom plates;
a plurality of blades disposed between the top and the bottom plates in a symmetrical configuration about the center axis, each blade comprising at least one cambered airfoil, wherein a camber line at a leading edge of each airfoil is perpendicular to a normal to the center axis and the leading edge is closer to the center axis than the trailing edge;
a shaft attached to the bottom plate, the shaft being in coaxial alignment with the center axis; and
a generator having a stator and a rotor, the rotor being driven by the shaft, wherein the rotor and the shaft have the same angular velocity.

2. A vertical axis wind turbine according to claim 1, wherein between three and six blades are disposed between the top and the bottom plates.

3. A vertical axis wind turbine according to claim 1, wherein each blade comprises a leading airfoil and a trailing airfoil.

4. A vertical axis wind turbine according to claim 3, wherein the leading and the trailing airfoils are in a configuration where a line normal to the center axis and tangential to a trailing edge of the leading airfoil intersects the trailing airfoil at about one quarter of a chord length thereof.

5. A vertical axis wind turbine according to claim 1, further comprising a magnetic bearing supporting the shaft, the magnetic bearing configured to allow the shaft to rotate about the center axis and to stabilize the shaft in a vertical orientation.

6. A vertical axis wind turbine according to claim 5, wherein the magnetic bearing is a passive magnetic bearing.

7. A vertical axis wind turbine according to claim 5, wherein the magnetic bearing is an active magnetic bearing.

8. A vertical axis wind turbine according to claim 7, further comprising a control module and a battery in electrical communication with the active magnetic bearing, the control module configured to stabilize the shaft.

9. A vertical axis wind turbine according to claim 1, further comprising a one-way bearing configured to translate rotation of the shaft to the rotor of the generator.

10. A vertical axis wind turbine according to claim 1, wherein the generator is a permanent magnet generator.

11. A vertical axis wind turbine according to claim 1, further comprising a radar-absorbing mesh laterally enclosing the blades, the mesh configured to reduce radar reflective scrambling interference by eliminating random wave return from the blades.

12. A vertical axis wind turbine, comprising:
a top plate and a bottom plate in coaxial alignment along a center axis, the center axis being perpendicular to both the top and the bottom plates;
a plurality of blades disposed between the top and the bottom plates in a symmetrical configuration about the center axis, each blade comprising a leading and a trailing cambered airfoils, wherein a camber line at a leading edge of each airfoil is perpendicular to a normal to the center axis and the leading edge is closer to the center axis than the trailing edge;
a shaft attached to the bottom plate, the shaft being in coaxial alignment with the center axis;
a magnetic bearing supporting the shaft, the magnetic bearing configured to allow the shaft to rotate about the center axis;
a permanent magnet generator having a stator and a rotor, the rotor being driven by the shaft via a one-way bearing, wherein no gears are being used to translate rotational motion of the shaft to the rotor, the rotor and the shaft having the same angular velocity.

13. A vertical axis wind turbine according to claim 12, wherein the leading and the trailing cambered airfoils are in a configuration where a line normal to the center axis and tangential to a trailing edge of the leading airfoil intersects the trailing airfoil at about one quarter of a chord length thereof.

14. A vertical axis wind turbine according to claim 12, wherein the magnetic bearing is a passive magnetic bearing.

15. A vertical axis wind turbine according to claim 12, wherein the magnetic bearing is an active magnetic bearing.

16. A vertical axis wind turbine according to claim 15, further comprising a control module and a battery in electrical communication with the active magnetic bearing, the control module configured to stabilize the shaft.

17. A vertical axis wind turbine according to claim 12, further comprising a radar-absorbing mesh laterally enclosing the blades, the mesh configured to reduce radar reflective scrambling interference by eliminating random wave return from the blades.

18. A vertical axis wind turbine according to claim 12, further comprising a fluidly sealed housing enclosing the generator and the magnetic bearing.

* * * * *